(No Model.)
R. GLOCK & S. MOON.
HOOF PARER.
No. 338,400. Patented Mar. 23, 1886.
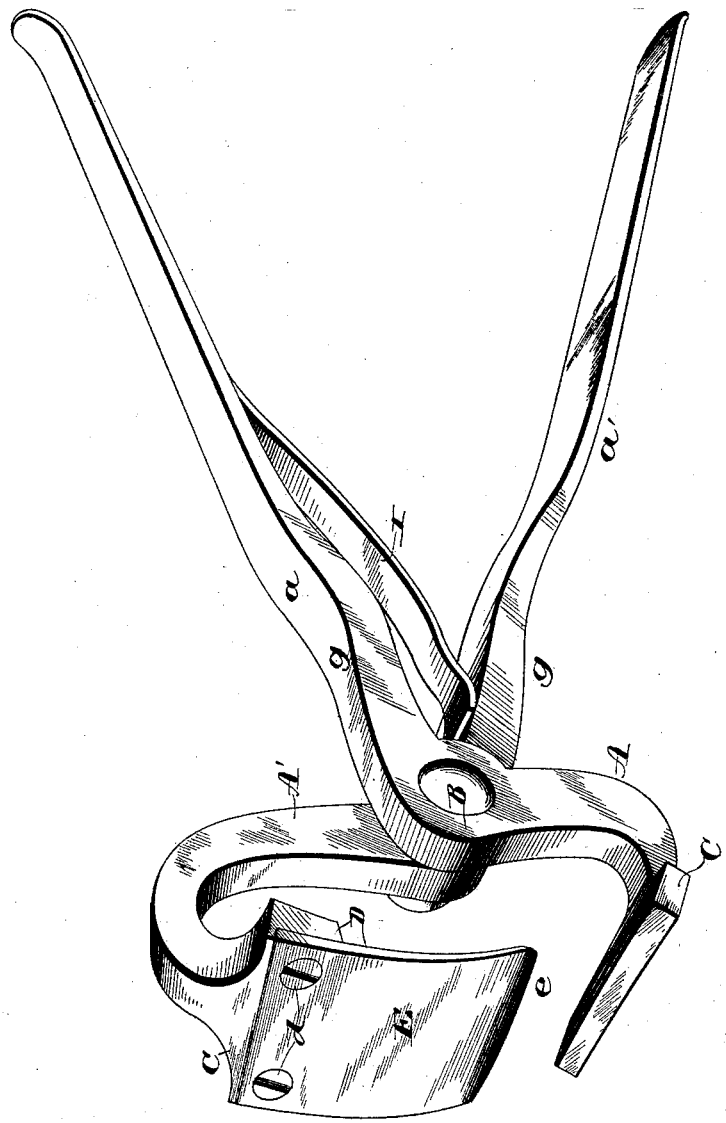

United States Patent Office.

RUDOLPH GLOCK AND STOVER MOON, OF GREEN, KANSAS.

HOOF-PARER.

SPECIFICATION forming part of Letters Patent No. 338,400, dated March 23, 1886.

Application filed November 25, 1885. Serial No. 183,972. (No model.)

*To all whom it may concern:*

Be it known that we, RUDOLPH GLOCK and STOVER MOON, of Green, in the county of Clay and State of Kansas, have invented certain new and useful Improvements in Hoof-Parers; and we do hereby declare the following to be a full, clear, and exact description of the invention, such as will enable others skilled in the art to which it appertains to make and use the same.

Our invention relates to an improvement in hoof-parers.

The objection to the parers hitherto in common use has been that there was not sufficient space between the abutment-jaw and the knife-jaw to admit of the attachment thereto of a suitable paring-knife, or if such distance were obtained there was a lack of sufficient purchase to make the parer operate easily. It has also been customary to provide the abutment with a slot adapted to receive the blade, which construction is apt to cause delay and annoyance on account of clogging.

The object of our present invention is to provide a parer which will not clog, will be capable of being operated with ease, which will automatically open, and the handles of which will not close tightly enough to pinch the fingers.

A further object is to provide a strong, durable, and comparatively inexpensive parer adapted to general use in preparing a horse's hoof for the shoe.

With these ends in view our invention consists in certain features of construction and combinations of parts, as will be hereinafter described, and pointed out in the claim.

In the drawing is shown a perspective view of my device, in which A A' represent, respectively, the abutment and the knife-jaw of the parer, and $a$ $a'$ represent the handles attached to said jaws. The handles are pivoted or hinged together by a bolt, B—for example, after the manner of shears. The jaws A A', as they leave the pivotal point B, turn at an angle of about ninety degrees with the handles, and after extending the proper distance (two inches, more or less) they curve around toward each other, terminating in cross-heads C C'. The head C is slightly concave on its face, to adapt it to the curve of the horse's hoof, and is made sufficiently heavy to form a strong solid abutment against the edge of the hoof to be pared. The cross-head C' is cut away on its outer side, as shown at D, forming an extended seat for the reception of the back of the knife E. The knife E is slightly curved in the direction of its length, and its edge $e$ is also made rounding, to better adapt it to force its way through the hard hoof. The knife is secured to the cross-head C' by means of a pair of screws, $d$, which extend through perforations formed therein, and into threaded sockets or perforations $f$, formed in the head. When in position, the outer or convex side of the blade is flush with the outside of the head C', and the heads of the screws $d$ are countersunk flush with the surface of the knife. As the jaws close, the edge of the blade shuts past the inner edge of the abutment C, and, in conjunction therewith, forms a shearing cut, which severs the shaving from the hoof at the outer or horny surface thereof. The handles, as they extend from the pivotal bolt, make a slight curve toward each other, as shown at $g$, and then diverge for a short distance, after which they run parallel with each other to a point, $h$, near their extreme end, where they curve slightly outwardly to prevent them from sliding too freely out of the grasp of the operator. A spring, I, is secured at one of its ends to the inside of one of the handles, its free end resting in contact with the inside of the other handle near the pivotal bolt, and serving to cause the handles to automatically separate and the jaws to open when the grasp is released. The curve of the jaws, while admitting of a wide separation of the ends of the jaws, and hence of the introduction of a suitable blade or knife, at the same time brings the point where the work is performed, only a short distance from the pivotal point, and hence admits of exerting great force upon the cutting-edge with a slight expenditure of power on the handles. The means for preventing the handles from meeting at the point where the hand is applied is also simple and effective, while the introduction of the spring enables the operator to use the instrument with one hand, as the jaws clear themselves and open for a new cut. There being no slot for the reception of the knife-edge, no wedging or clogging occurs, and the instrument as a whole is simple, strong, and handy.

It is evident that slight changes might be resorted to in the form and arrangement of the several parts without departing from the spirit and scope of our invention; hence we do not wish to limit ourselves strictly to the construction herein set forth; but, Having fully described our invention, what we claim as new, and desire to secure by Letters Patent, is—

In a hoof-parer, the combination, with a pair of pivotal jaws branching outwardly from the pivotal joint, and then curving toward each other, as shown, one of said jaws having a concave-faced abutment on the free end thereof and the other jaw having a blade secured to the free end thereof, of the handles secured to the jaws and curved or bent toward each other near the pivotal point of said jaws to form a stop, and a spring interposed between the handles, all of the above parts constructed and combined substantially as set forth.

In testimony whereof we have signed this specification in the presence of two subscribing witnesses.

RUDOLPH GLOCK.
     STOVER MOON.

Witnesses:
 SAMUEL DAVIDSON,
 L. F. C. GARDNER.